Sept. 5, 1939.     H. L. M. PRAUD     2,172,108
HEATING APPARATUS
Filed Dec. 27, 1934     5 Sheets-Sheet 1

Sept. 5, 1939.  H. L. M. PRAUD  2,172,108
HEATING APPARATUS
Filed Dec. 27, 1934  5 Sheets-Sheet 2

Inventor:
Henri Laurent Marie Praud
by his attorney

Sept. 5, 1939. H. L. M. PRAUD 2,172,108
HEATING APPARATUS
Filed Dec. 27, 1934 5 Sheets-Sheet 3

Fig. 4

Inventor:
Henri Laurent Marie Praud
by
his Attorney

Sept. 5, 1939.   H. L. M. PRAUD   2,172,108
HEATING APPARATUS
Filed Dec. 27, 1934   5 Sheets-Sheet 4

Inventor:
Henri Laurent Marie Praud
by his attorney

Patented Sept. 5, 1939

2,172,108

UNITED STATES PATENT OFFICE 2,172,108

HEATING APPARATUS

Henri Laurent Marie Praud, Paris, France, assignor, by mesne assignments, to American Radiator & Standard Sanitary Corporation, New York, N. Y., a corporation of Delaware Application December 27, 1934, Serial No. 759,329
In France December 28, 1933

2 Claims. (Cl. 236—91)

This invention relates to the regulation of thermic apparatus, including generators of heat, such as boilers, and generators of cold. It concerns more particularly apparatus of this kind for heating or cooling large premises, such as houses, theatres, cold storage warehouses, and the like, the power of which apparatus it is necessary, for the sake of economy, to proportion exactly to the consumption of heat or cold determined by the outdoor temperature and other thermic conditions, such as the wind, generally, so that the temperature of the premises remains constant.

It is an object of the invention to provide a process and means for automatically controlling the regulation of the power of a thermic apparatus as a function of the outdoor conditions, such as the temperature and the wind.

Another object of the invention is to provide a process and means for the automatic regulation of the power of the thermic apparatus, so as to maintain constant the temperature of the premises which are served by such apparatus.

Another object of the invention is to measure the losses of heat of an isothermic member exposed to the outdoor air, and to control a device for regulating the power of the thermic apparatus by means of such measure, suitably transmitted and converted into a controlling movement.

Another object of the invention is to retard the variations of said losses with respect to the variations of the outdoor conditions and to render such losses relatively low.

Another object of the invention is to impose a limit on the measure transmitted, so that the said regulating device cannot be controlled by said measure beyond the greatest power allowable of the thermic apparatus.

Another object of the invention is to measure the losses of heat of the isothermic chamber by controlling together the supply of heat to said chamber, so that its temperature remains constant, and a supply of thermic energy to the said regulating device, and to convert such energy into a controlling movement.

Another object of the invention is to measure the heat losses of the said chamber by controlling together the supply of the heat to said chamber, so that its temperature remains constant and a supply of electric energy to the said regulating device, and to convert such energy into a controlling movement.

A further object of the invention is to convert first of all into heat the said electric energy, and then to convert said heat into a movement for controlling the regulating device.

A still further object of the invention is to reduce the quantity of heat which is to be converted into a controlling movement.

Yet another object of the invention is to limit the energy supplied to the regulating device, so that the greatest power allowable of the thermic apparatus shall not be exceeded.

Another object of the invention is to subordinate the supply of the said energy to a device responsive to the temperature of the fluid produced by the thermic apparatus so that such supply is stopped when the said temperature attains a predetermined limit, in order that the greatest possible power allowable of the thermic apparatus shall not be exceeded.

Another object of the invention is to make the relations adjustable between the heat losses of the isothermic chamber and the consequent control of the regulating device of the thermic apparatus.

Another object of the invention is to regulate the ratio between the heat supplied to the said chamber and the energy supplied simultaneously to the said regulating device.

Another object of the invention is to control by full opening or closing the supply of heat to the said chamber and to damp the effect of the similar impulses in the transmission of the measure of said supply to the regulating device, so that the latter is responsive to the mean value of said measure.

Another object of the invention is to control together by full opening or closing the supply of the heat to the said chamber and the supply of an energy to the regulating device, and to damp the effect of the resultant impulses in the energy transmitted, so that the regulating device is responsive to the mean value of said energy.

Another object of the invention is to provide thermic inertia between the heat supplied to the regulating device and the device which converts such heat into a controlling movement.

Another object of the invention is to cause the heat supplied to the regulating device to act on an expansible member which converts it into a controlling movement.

Another object of the invention is to control the regulating device both by the measure of the heat losses of the said chamber, and by a stabilizer of the power of the thermic apparatus, so that such power is maintained by said stabilizer at the value determined by the said measure.

Another object of the invention is to cause the moving member, which is responsive to the measure of the said losses of heat, to cooperate with the moving member of the power stabilizer on a single control member of the said regulating device.

Another object of the invention is to cause the expansible member which is responsive to the heat supplied to the regulating device to cooperate with an expansible member which is responsive to the temperature of the fluid supplied by the thermic apparatus to act differentially on a control lever of the said regulating device.

Other objects and characteristics of the invention, in its application to the regulation of a boiler for central heating, will become apparent from the ensuing description taken in conjunction with the accompanying drawings.

The regulating system according to the invention essentially comprises a member such as a chamber 1 in which a certain constant temperature, higher than the outdoor temperatures to be considered, is maintained, by means of a source of heat, such as an ohmic resistance 2 arranged within said chamber, and a thermostat, such as a bi-metallic switch 3 controlling the supply of energy to the source 2.

Figure 1:
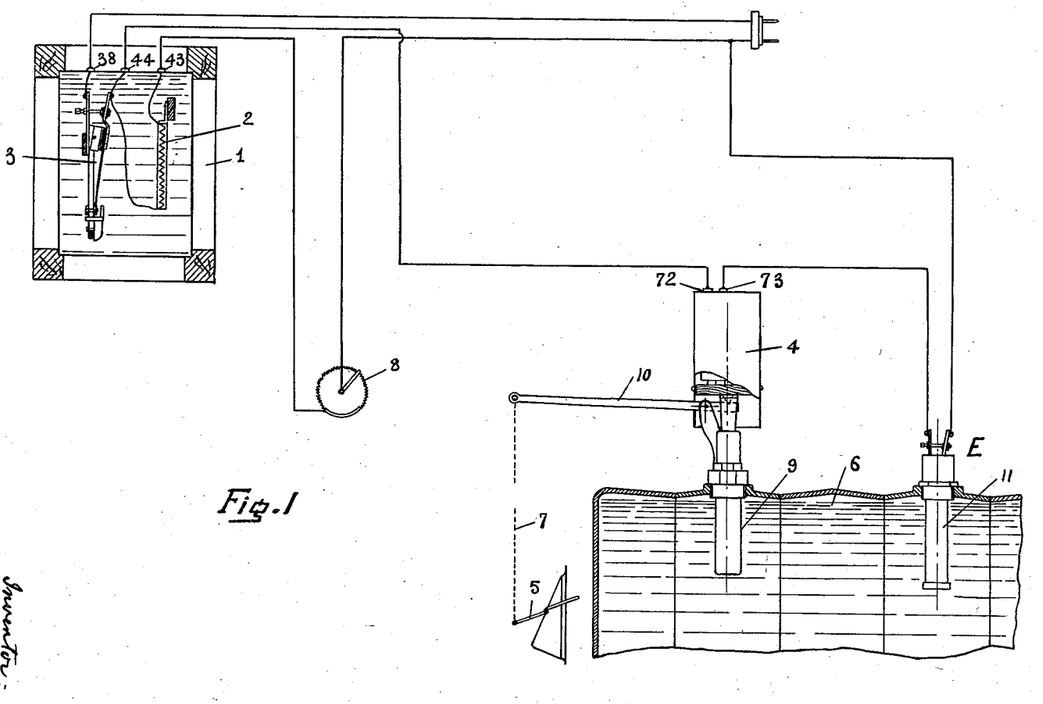
Fig. 1 is a diagrammatic view showing an automatic regulating system according to the invention.

The invention is based on the evaluation of the heat losses of the chamber 1 which vary essentially with the outdoor temperature but depend also on other conditions, such as the wind. The value of such losses corresponds therefore better than the outdoor temperature to the thermic energy which would be supplied by a thermic apparatus, such as a boiler for central heating to the premises to be heated, so as to maintain the temperature of such premises constant. The variations of said losses are substantially proportional to the variations of the heat losses of the premises heated by the thermic apparatus, the latter losses being in the form of a cooling or a heating, according to whether the premises are heated or cooled by the thermic apparatus. The heat losses of the chamber 1 are exactly represented by the thermic energy consumed by the source 2. According to the invention, the measure of such losses must be suitably transmitted and converted in order to be able to control the usual regulating device of the thermic apparatus. In the example illustrated, the thermostat 3 controls simultaneously by full opening or closing the supply of energy to the source 2 and the transmission of an energy to a control device 4. In the example illustrated, these two energies are electric currents controlled by the switch 3. In this manner, the energy transmitted to the control device 4 is proportional to the energy supplied to the isothermic chamber. Said device 4 is adapted in any suitable manner to control the regulating device 5 which is in this case the regulator of the boiler, according to the quantity of current which it receives, that is to say, finally, as a function of the heat losses of the chamber 1. The regulating device 5 can in other cases be a cock for inlet of liquid fuel, a rheostat controlling the heating of electric radiators, or of electric boilers, or the electric motor of a cooling apparatus, etc. The control device 4 is suitably constructed so that the losses of the chamber 1 which represent also the heat losses in the house heated by the boiler 6, correspond exactly to the position of the regulator 5 which determines the temperature of the water supplied to the radiators of the central heating installation.

The heat losses of the isothermic chamber also depend essentially on its lagging. In order to reduce the consumption of the resistance 2, said chamber is therefore lagged, but such lagging must not be too effective, since the rate at which the losses of the chamber adapt themselves to the outside conditions depends on such lagging. If the latter were too effective, said losses would adapt themselves to the variations of the outdoor conditions less quickly than the temperature of the premises, so that the power of the thermic apparatus would be regulated with a greater or lesser delay with respect to the heat losses of the premises, which would prevent maintaining a constant temperature therein. It is best to calculate such lagging so that the sum of all the delays of the regulating system, of the delay of the heat losses of the isothermic chamber with respect to the variations of the outdoor conditions, of the delay in the action of the control and regulating devices with respect to the variations of said heat losses, and of the delay of the thermic energy actually supplied to the premises by the thermic apparatus with respect to the variations of the regulating device, corresponds as far as possible to the delay of the heat losses of the premises with respect to the variations of the outdoor conditions.

The control, by full opening or closing, in the example illustrated corresponds to the usual mode of operation of thermostats. However, the invention is not limited to a control by transmission of energy to the device 4 such as hereinbefore described. The essential characteristic of the method of the invention is to measure the thermic energy supplied to the isothermic chamber, to transmit such measure to the thermic apparatus and to convert it into a movement for controlling the regulating device of the latter apparatus, and these operations could be effected by various well known means.

The action of the control device 4 depends of course on the temperature maintained in the chamber 1. However, said temperature affects the regulation of the thermic apparatus in a manner which is very simple to correct, for example by merely modifying the length of the chain 7 which actuates the regulator 5 so that it is not necessary to regulate said temperature. This temperature, determined by the thermostat 3, can be chosen arbitrarily, but above the outdoor temperature which corresponds to the upper limit of the regulation, since the energy supplied to the resistance 2 remains constantly nil as soon as the outdoor temperature reaches and exceeds that temperature, and no regulation is then possible. In the case of central heating, it is convenient to adjust the thermostat 3 so that the temperature of the chamber 1 is equal to or but little greater than the outdoor temperature at which the heating of the premises must be stopped. It should be noted that, on the other hand, when the outdoor temperature falls, it can attain a value at which the losses of the isothermic chamber can only be compensated by an uninterrupted supply to the resistance 2. Below this value of the outdoor temperature, the regulation will therefore no longer take place, the thermostat 3 remaining constantly closed. Consequently, the power of the source of heat 2 must be chosen so that it is only brought into uninterrupted action below a temperature which is lower than or equal to the lower limit of the regulation.

This action depends also on the ratio between the losses of the chamber 1, that is to say, the energy consumed in the resistance 2 and the action of control device 4, which depends on the quantity of current which is supplied to it. The corresponding regulation could be effected by acting on the manner in which the device 4 controls the regulating device 5, but it is easier to regulate directly this ratio for example by means of a rheostat 8 interposed in the conductor supplying the resistance 2, as shown in the drawings, or in the conductor supplying the control device 4.

It is particularly advantageous to combine the control of the regulation by the losses of the chamber 1 with a control responsive to the power of the thermic apparatus, for example to the temperature of the boiler 6, the latter control being adapted to ensure the stabilization of such power by any usual appropriate means, for example by means of an expanding device 9 mounted in the boiler. In a convenient embodiment of said combined control the device 4 and the device 9 act differentially on a common control member, such as the usual lever 10 controlling the regulator 5 of the boiler. In this manner, when the power of the thermic apparatus increases for accidental reasons, the stabilizing device 9 acts on the regulating device 5, so as to bring said power back to the constant power desired. On the other hand, such constant value is determined by the action of the device 4, that is to say by the losses of the chamber 1, which correspond to the thermic energy which must be supplied to the premises to maintain their temperature constant.

When the outdoor conditions vary so as to necessitate an increase in the power of the thermic apparatus, the device 4 acts on the device 5 in a corresponding manner. However, the power of the thermic apparatus generally has a limit, such as a limiting temperature of the water of the boiler 6, which it would be dangerous to exceed. It is therefore necessary to limit the possible action of the device 4. Such limitation can be obtained for example in the case illustrated, by constructing the control device 4 in such a manner that when it receives current in an uninterrupted manner and thus supplies its maximum action, it causes the boiler 6 to operate at its maximum power allowable (for example heating the water to 95° C.). As already stated, the device 4 is uninterruptedly supplied when the resistance 2 is supplied in an uninterrupted manner, which occurs when the outdoor temperature falls below the value mentioned above. It is therefore convenient to construct the resistance 2 so that such value of the temperature coincides with the lower limit of the regulation. In this case when the outdoor temperature falls to this value, the resistance 2 and the device 4 will be supplied in an uninterrupted manner, and the thermic apparatus will produce its greatest allowable power, that is to say it will be at the limit of its regulation. When the outdoor temperature falls further, the resistance 2 cannot be supplied with more current and the action of the device 4 will not increase either. The corresponding limit of the power of the apparatus 6 will therefore not be exceeded. However, the limitation of the power of the apparatus 6 would thus only be obtained indirectly, and the invention offers means of ensuring it directly. For this purpose, the supply of energy to the device 4 is subordinated to a limiting device 11 responsive to the power of the apparatus 6. Thus, in the example illustrated in Fig. 1, the electric circuit of the device 4 passes through a switch controlled by the device 11, which is an expanding device mounted in the boiler and regulated so that it opens its switch when the temperature of the water reaches 95° C.

In the foregoing, reference has been made to a boiler for central heating, but it is obvious that the action of the system of the invention would be similar in the case of a cooling apparatus. The action of the device 4 would only have to be reversed, so as to increase the power of the thermic apparatus when the outdoor temperature rises, that is to say when the energy supplied to the chamber 1 and the device 4 diminishes.

Various embodiments of the chamber 1 and of the control device 4 will now be described, the limiting device 11 being well known per se, and it is therefore not necessary to describe it in detail.

Figure 2:
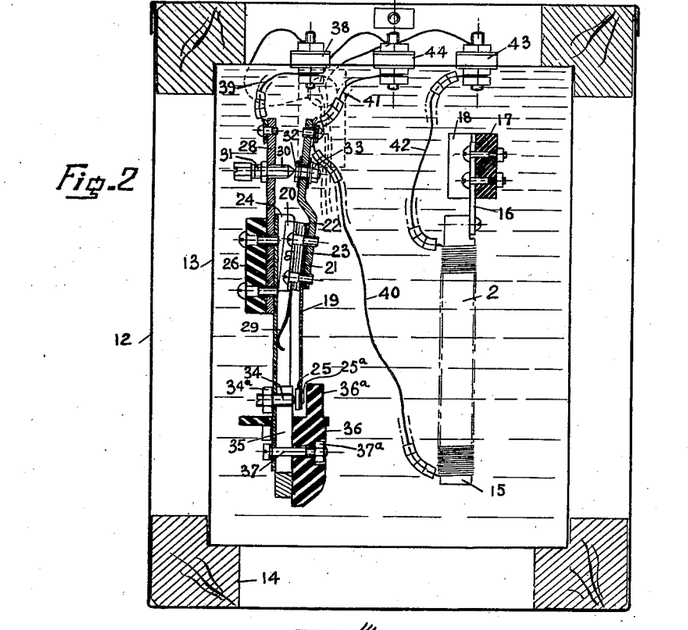
Fig. 2 is a vertical longitudinal section of an isothermic chamber exposed to the outdoor air.
Figure 3:
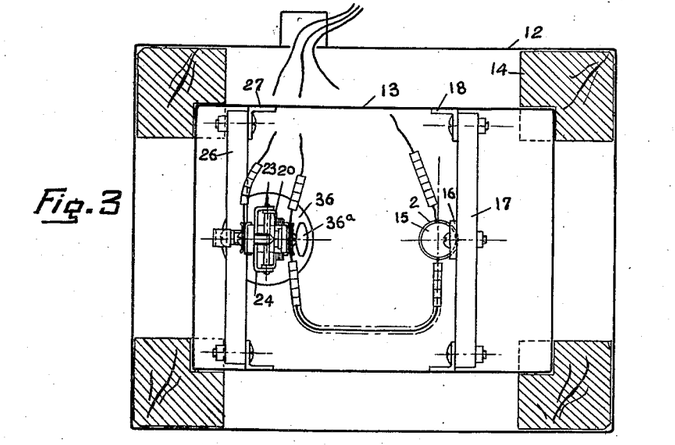
Fig. 3 is a horizontal section of same.

Referring to Figs. 2 and 3, the isothermic chamber is constituted by an outer metal box 12 within which is mounted a second metal box 13 by means of wooden wedges 14, with a certain spacing between all the respective walls of the two boxes. Such spacing forms a layer of air serving as an insulator. The box 13 is filled with a liquid which is a conductor of heat and a non-conductor of electricity such as oil. Within said box are mounted the ohmic resistance and the thermostat mentioned with respect to Fig. 1. The resistance 2 is wound on an insulating core 15 carried by a bar 16 screwed to a crosspiece 17 fixed to the walls of the chamber 13 by angle brackets 18. The thermostat is constituted by a bimetallic spring 19 one end of which is fitted in a mounting constituted by a strap 20, an insulating wedge 21 and a rigid tail 22. Said mounting pivots on an axis 23 passing through the cheeks of the strap 20 and those of a fixed strap 24. The end of the bimetallic spring 19 carries a contact stud 25. The fixed strap 24 is constituted by a bar of U-shaped cross-section which is screwed on to a cross piece 26 fixed to the box 13, as the cross-piece 17, by means of angle brackets 27.

Between the bar 24 and the cross-piece 26 is fitted a rigid tail 28 extending opposite the tail 22 which is secured to the pivoting mounting of the bimetallic spring. A leaf spring 29 is fitted into said mounting between the strap 20 and the wedge 21. Said spring bears on the bar 24 and tends to cause the mounting of the bimetallic spring to swing in a counter-clockwise direction. A regulating screw 30 fixed in the tail 28 by means of a lock nut 31 and cooperating with a stud 32 fixed in the tail 22 by means of a nut 33 opposes this movement. By means of the spring 29 and the screw 30, the mounting therefore remains constantly in the position shown in the drawings, the stud 32 abutting on the screw 30 and this position can be regulated by acting on the screw 30. Near its lower end the bar 24 carries a contact screw 34 held by a nut 34a and cooperating with the contact stud 25 of the bimetallic spring. This end of the bar 24 carries furthermore a magnet 35 and a protecting member 36 secured on the bar 24 by a bolt 37 provided with a nut 37a. The ends of the magnet 35 are on either side of the screw 34 and they cooperate with a magnetic armature 25a carried by the bimetallic spring 19 behind the contact stud 25. This device effects in known manner the rapid make and break of the contact 25—34. The member 36 is provided with a projection 36a arranged behind the end of the bimetallic spring so as to limit its spacing from the screw 35.

The common wire coming from the source of electricity is connected to a terminal 38 which is connected to the inside of the box 13 by a wire 39 at the end of the tail 28 which conducts the current, by its contact with the bar 24, to the contact screw 34.

The contact stud 25 transmits the current, through the bimetallic spring and the tail 22 to two wires 40 and 41 fixed to the end of said tail. The wire 40 is connected to one end of the resistance 2, the other end of which is connected, by a wire 42, to the terminal 43 which is connected to the return wire leading to the other pole of the source of electricity. The wire 41 is connected to a terminal 44 which is connected to a wire conveying the current to the control device 4 of Fig. 1, the output of the electric circuit of said device being connected, as the terminal 43, to the other pole of the electric source. The parts under tension are suitably insulated. Thus the parts 28 and 24 are fixed to the insulating bar 26 which insulates them from the box 13. The bimetallic spring 19 and its tail 22 are insulated from the strap 20 by the insulating wedge 21 and a suitable insulation of the cap screws. The stud 32 touching the screw 30 is of insulating material or suitably insulated from the tail 22. The resistance 2 is wound on an insulating core which is carried furthermore by the insulating crosspiece 17. Finally, the flexible wires mounted in the box 13 are fitted with beads which prevent them creating undue contacts.

The thermostat is regulated by the screw 30 so that the stud 25 touches the screw 34 or moves away therefrom for very adjacent temperatures of the liquid filling the box 13, so that these neighbouring limits define the desired constant temperature of the isothermic box. When the temperature of the said liquid reaches for example 21° C., the bimetallic spring 19 moves away from the screw 34, thus cutting off the supply from the resistance 2 and from the device 4. The temperature of the liquid then begins to fall, and when it reaches 20° C., the bimetallic spring returns to the screw 34 and re-establishes the supply to the resistance and to the control device. The energy supplied to the resistance 2 is therefore regulated by a full opening or closing, the periods of action and of inaction of said resistance varying inversely, according to whether the losses of heat of the isothermic box increase or diminish, so that the mean energy consumed by the resistance is equal to said losses.

Figure 4:
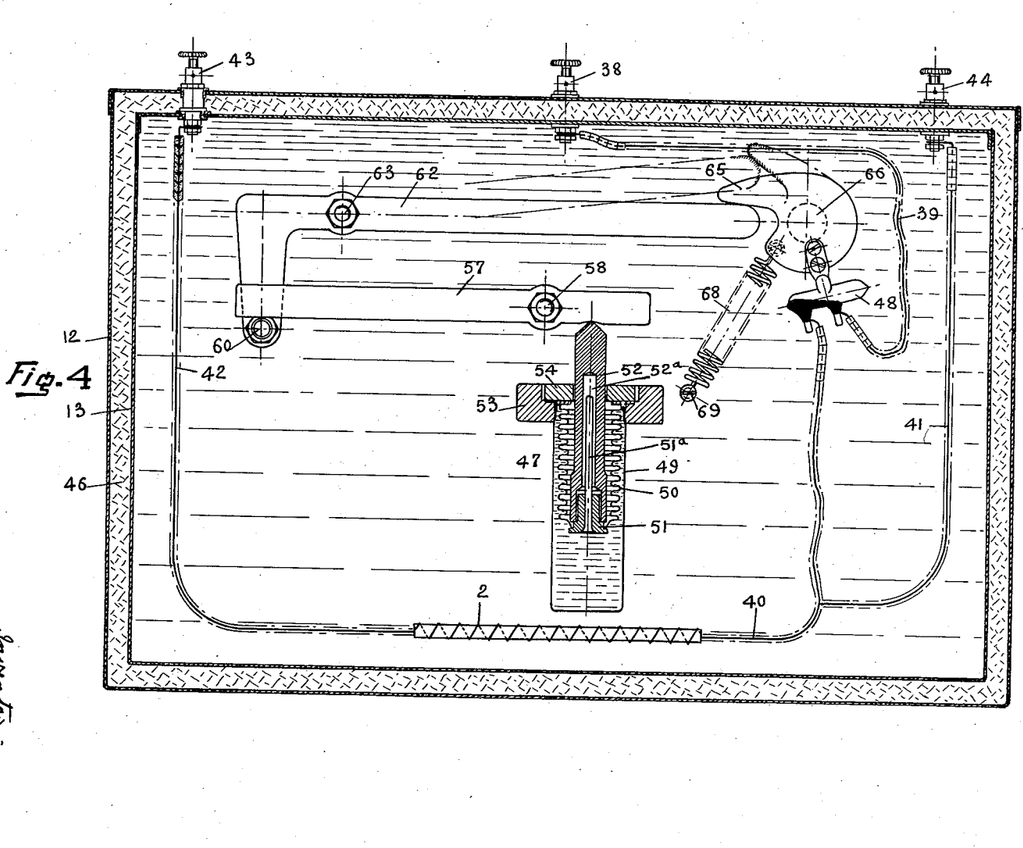
Fig. 4 is a vertical longitudinal section of another isothermic chamber according to the invention.
Figure 5:
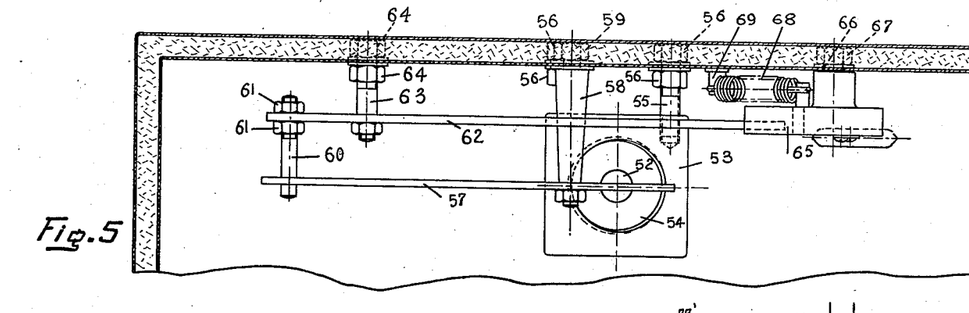
Fig. 5 is a partial horizontal section.

Referring to Figs. 4 and 5, the isothermic chamber is constituted by an outer metal box 12 and an inner metal box 13 between the respective walls of which is arranged a lagging 46 such as slag wool. As in the preceding figures, the inner chamber 13 is filled with liquid and heated by an electric resistance 2. The thermostatic control device is in this case constituted by an expanding device 47 actuating a mercury switch 48. The device 47 is constituted by a closed cylinder 49 in which is arranged a metal bellows 50. The upper ends of the cylinder and of the bellows are soldered together. The lower end of the bellows is soldered to a plug 51 engaged in the lower end of a push rod 52 projecting beyond the upper end of the bellows. The filling tube 51a engages in a cavity 52a of the push rod. Said tube opens at its lower end in the cylinder 49, and is soldered to the bellows 50 or to the plug 51 and is closed at its top by soldering. The closed space between the cylinder 49 and the bellows 50 is filled with a liquid supplying a vapour tension which varies considerably with the temperature at the temperature of the isothermic chamber. For the temperature considered said liquid can be constituted by butane. The cylinder 49 is fitted into an annular mounting 53 provided with a screwed plug 54 serving as a guide for the push rod 52 which passes through it. The mounting 53 is fixed to the adjacent wall of the box 13 by bolts 55 screwed on the one hand to said mounting and secured, on the other hand, to the wall of said box by nuts 56.

The push rod 52 acts from below on one end of a lever 57 which is fulcrumed on the end of a rod 58 fixed to the same wall by a nut 59. The other end of the lever 57 acts from above on a finger 60 fixed by nuts 61 at one end of a bellcrank 62 pivoting on an axis 63 fixed to the same wall by nuts 64. The other end of the lever 62 acts from below on a cam 65 pivoting on an axis 66 also fixed to said wall of the box 13 by a nut 67. The cam 65 carries the switch 48 and it is held in contact with the end of the lever 62 by a spring 68. The other end of the spring 68 is attached to a lug 69 fixed to the same wall.

The switch 48 is interposed between the common conductor 39 connected to the terminal 38 and the conductors 40 leading to the resistance 2, and 41 leading to the terminal 44 and connected to the control device 4 of Fig. 1. The other terminal of the resistance 2 is connected by a conductor 42 to the terminal 43.

In the position shown in the drawings, the switch 48 is closed, and the resistance 2 receives a current. When the temperature of the liquids filling the box 13 and the cylinder 49 reaches, for example, 21° C., the butane develops a vapour tension such that it raises the end of the lever 57 so as to bring the end of the lever 62 and the cam 65 into the position shown in dotted lines against the action of the spring 68. The switch 48 then breaks the circuit of the resistance 2 and of the control device 4. The temperature of the liquids then decreases and when it reaches 20° C., the members return to the position shown in the drawings, thus switching on the current again. The axes 58 and 63 are arranged so that the levers 57 and 62 ensure the required multiplication of the usually small movement of the push rod 52.

Figure 6:
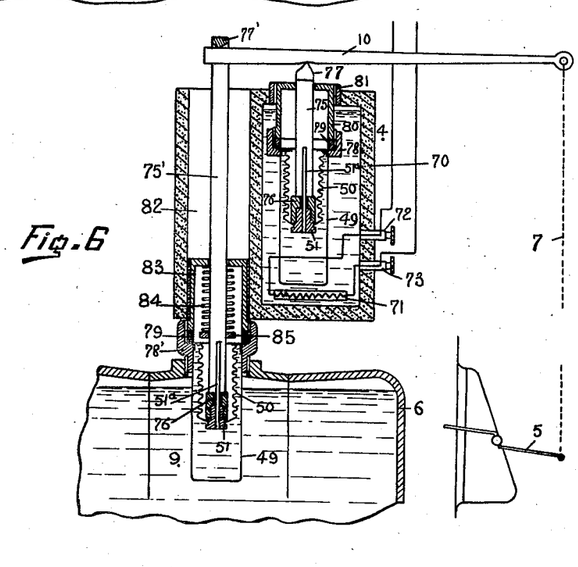
Fig. 6 is a vertical section of a combined control device according to the invention for the regulation of the draft and of the temperature of a boiler.

In Fig. 6 has been illustrated an embodiment of the control device 4 combined with the stabilizer 9. It has been stated above that the function of the control device 4 was to convert the energy which it receives from the isothermic chamber into a control movement. In the example illustrated, this energy is converted into heat and said heat causes the expansion which constitutes said control movement. The control device is constituted by a lagged double box 70, the inner box being filled, as the inner box of the isothermic chamber, with a liquid such as oil, and said liquid being heated by a resistance 71 the terminals 72 and 73 of which are respectively connected to the terminal 44 of the isothermic box and to the second pole of the source of electricity, the first pole of which is connected to the terminal 38 of the isothermic chamber. The limiting device 11 described with respect to Fig. 1 can be interposed in the circuit of the control device on one side or on the other side of said device. In Fig. 1 it is connected on the side of the terminal 73.

In the box 70 is mounted an expanding device similar to that of Figs. 4 and 5. Said device has a cylinder 49 filled with a suitable liquid acting by expansion, such as kerosene, and containing a bellows 50 the upper end of which is soldered to the cylinder, and the lower end to a plug 51 provided with a tube 51a. The push rod is constituted by two uprights 75 connected at their lower end by a base 76 which can engage in the plug 51. At the top, the uprights 75 are connected by a knife 77 constituting the push member itself. The cylinder 49 is fixed in a circular mounting 78 in which are screwed a ring 79 and a sleeve 80, the upper end of which is screwed into a ring 81 fitted into the box 70. The closed top of the sleeve 80 serves as a guide for the uprights 75 of the push rod.

The lagged box 70 is provided with a compartment 82 in the form of a chimney, which is firmly fixed on a sleeve 83 similar to the sleeve 80 and belonging to the stabilizer device 9. Said device is an expanding device similar to the preceding one. It is constituted by a cylinder 49 immersed in the water of the boiler 6. In said cylinder are mounted a bellows 50, a plug 51 provided with a tube 51a, and a push rod provided with a base 76, with two uprights 75' passing upwardly through the chimney 82 and with an inverted knife 77'. In the sleeve 83 is arranged a spring 84 bearing on one side on the top of said sleeve and on the other, on a collar 85 fixed on the uprights 75'. The circular mounting 78' of the cylinder 49 is screwed into the boiler.

The lever 10 of the aeration regulator 5 bears on the knife 77 of the control device, and its end opposite the one which controls the chain 7 is engaged under the knife 77' of the stabilizing device.

When, under certain outdoor conditions, the thermostat of the isothermic box closes, and breaks at a certain rate the circuit leading to the control device, the resistance 71 of said device receives an energy which heats the liquid filling the box 70. Said liquid provides thermic inertia and its heating does not follow the current impulses which the resistance 71 receives, but only the mean energy. The temperature of said liquid therefore increases proportionally to the mean energy which the resistance 71 receives, which is proportional to that which the resistance 2 receives, and, as the latter is equal to the losses of the isothermic box under the given outdoor conditions, which are a substantially linear function of the outdoor temperature, it results that the temperature of the liquid of the control device is substantially a linear function of the outdoor temperature. It therefore varies to a fairly wide extent, and its variations can be greater or smaller than those of the outdoor temperature, according to the ratio between the powers of the two resistances, which is regulated by the rheostat 8, and according to the effectiveness of their lagging.

It will be noted that the lagging of the box 70 enables the desired elevation of the temperature of the liquid to be obtained by means of a resistance 71 consuming relatively little energy, but it is necessary to take into account what has been said regarding the lagging of the isothermic box. When the temperature of the control device increases, the liquid contained in the cylinder 49 moves the push rod 77 upwards which moves upwardly the end of the lever 10 to which is attached the chain 7 of the regulator 5. The movements of said chain will therefore be proportional to the variations of the outdoor conditions, the ratio being regulated by means of the resistance 8. The upward movement of the lever 10 causes an increase in the heating, and the temperature of the water increases. This expands the stabilizing device and its push rod 77' moves upwards in its turn and causes downward movement of the lever 10. The ratio between the temperature in the device 4 and the corresponding temperature of the water in the boiler, and the ratio between the contractions of the bellows of the devices 4 and 9, are chosen in such a manner that finally the lever 10 comes to rest in a position in which the water is heated in a manner corresponding to the new outdoor conditions. By a suitable adjustment, the water can be constantly maintained at the temperature which is necessary to maintain, under any given outdoor conditions, a constant temperature in the heated premises. It will be noted that the variations of the energy which the boiler has to supply to the premises are substantially proportional to the variations of the outdoor temperature, but when other outdoor conditions have also to be taken into account, for example the wind, such conditions act in the same manner on the isothermic chamber and the premises heated, so that the regulation remains automatically correct.

It will furthermore be noted that the above-mentioned ratio does not depend on the constant temperature maintained in the isothermic chamber. The effect of said temperature is merely that of a constant added to the height of the control end of the lever 10, whatever its position may be, that is to say, whatever may be the outdoor temperature. The temperature of the isothermic chamber will therefore merely be taken into account by suitably shortening or lengthening the chain 7.

When, under definite outdoor conditions, that is to say, when the push rod 77 of the control device remains stationary, the temperature of the boiler varies for any accidental reason, the stabilizing device becomes operative and its push rod 77' corrects the position of the lever 10, so as to bring back the temperature of the boiler to the value corresponding to the outdoor conditions.

In order to avoid deteriorations in the event of undue pulling on the chain 7, the mounting of the push rod 75' described above has been provided. By means of such mounting when such push rod is carried upwards by the lever 10, it compresses the spring 84 and slides on the plug 51 as it moves upwards without deteriorating the bellows 50 of the control device and of the stabilizer.

Figure 7:
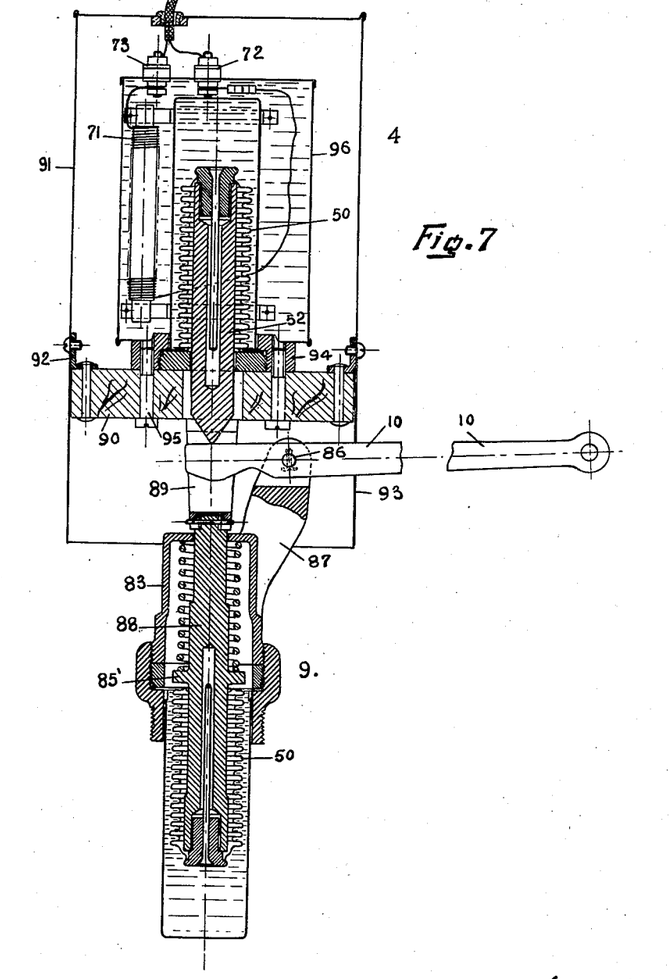
Fig. 7 is an axial vertical section of another embodiment of said device.

Fig. 7 illustrates another embodiment of the combined control device. The devices 4 and 9 are similar to those of the preceding figure, but they are assembled so as to act differentially on one end of the lever 10 which is fulcrumed on a fixed axis 86 carried on a bracket 87 secured to the sleeve 83 of the device 9. The push rod of this latter device is constituted by a rod 88 similar to the one of the expanding device of Figs. 4 and 5.

The collar 85' is in this case integral with said rod. On the upper end of said rod is screwed and pinned a strap 89 fixed at its other end to a bottom 90. Said bottom is made of insulating material, such as fibre, and it constitutes the lower wall of an outer box 91 fixed to said bottom by angle brackets 92. Said box extends below the bottom 90, so as to enclose one end of the lever 10 and is cut away at 93 to allow the other end of said lever to pass out.

The bottom 90 also carries a circular mounting 94 held by screws 95. To said mounting is soldered an inner box 96, the inside of which is arranged substantially as that of the box 70, but the expanding device occupies an inverted position therein. The push rod 52 of said device is similar to the one of the isothermic chamber of Figs. 4 and 5. Its end rests at the top on the end of the lever 10. The lagging of the control device 4 is in this case constituted by the layer of air which is between the boxes 91 and 96 and by the bottom 90.

The operation of said device is similar to that of the device of Fig. 6. When the bellows 50 of the device 4 contract under the indirect effect of a lowering of the outdoor temperature, the push rod 52 moves downwards and causes the end of the lever 10, in which the chain is hooked, to move upwards. As in Fig. 6, the movement of the push rod of the device 4 causes the lever 10 to be raised too much, which causes a rapid increase in the temperature of the water of the boiler. As said temperature rises, the bellows 50 of the device 9 contract in their turn, and cause the lever 10 to move downwards again, the latter finally coming to rest in the position corresponding to the continuous operation at the temperature which is suited to the new outdoor conditions.

It is of course obvious that the invention has only been described and represented here in a purely explanatory but by no means limitative manner, and that modifications of detail can be made therein without departing from its spirit.

I claim:

1. Mechanism for controlling a boiler for heating a building space, comprising a first chamber exposed to outdoor air and so constructed that the rate of heat loss therefrom simulates the rate of heat loss from the building space; a second chamber within said building; first and second heating elements in said first and second chambers, respectively; means for supplying heat energy to both of said elements; an on-and-off thermostat controlling concurrently the supply of heat energy to both of said heating elements so that the first heating element is supplied intermittently with heat energy to maintain the first chamber at a substantially constant temperature and the second heating element is supplied intermittently with heat energy as a proportionate measure of the amount supplied to said first heating element; said second chamber containing a heat-storing liquid, in which the second heating element is immersed, and operable to dampen the intermittent impulses of heat energy supplied to said second element so that the liquid temperature varies as a direct function of the average value of said heat impulses and consequently as a direct function of the rate of heat loss from said first chamber; a lever movable to different positions for regulating the heating of the boiler; an expansible-contractible member immersed in said liquid and including an actuating element extending exteriorly of said chamber and continuously engaging said lever and operable to convert the heat energy in said liquid into a movement of said lever so that the position of said lever, and consequently the heating of said boiler, varies continuously as a direct function of said liquid temperature.

2. Mechanism for controlling a boiler for heating a building space, comprising a first chamber exposed to outdoor air and so constructed that the rate of heat loss therefrom simulates the rate of heat loss from the building space; a second chamber within said building; first and second heating elements in said first and second chambers, respectively; means for supplying heat energy to both of said elements; an on-and-off thermostat controlling concurrently the supply of heat energy to both of said heating elements so that the first heating element is supplied intermittently with heat energy to maintain the first chamber at a substantially constant temperature and the second heating element is supplied intermittently with heat energy as a proportionate measure of the amount supplied to said first heating element; said second chamber containing a heat-storing liquid, in which the second heating element is immersed, and operable to dampen the intermittent impulses of heat energy supplied to said second element so that the liquid temperature varies as a direct function of the average value of said heat impulses and consequently as a direct function of the rate of heat loss from said first chamber; a lever movable to different positions for regulating the heating of the boiler; an expansible-contractible member immersed in said liquid and including an actuating element extending exteriorly of said chamber and continuously engaging said lever and operable to convert the heat energy in said liquid into a movement of said lever so that the position of said lever and consequently the heating of said boiler varies continuously as a direct function of said liquid temperature; and a second expansible-contractible member responsive to the rate of heat output of the boiler and continuously acting differentially on said lever to stabilize the heating of the boiler.

HENRI LAURENT MARIE PRAUD.